Patented Mar. 8, 1927.

1,620,073

UNITED STATES PATENT OFFICE.

NIELS A. CHRISTENSEN, OF MILWAUKEE, WISCONSIN.

VEHICLE BRAKE.

Application filed March 22, 1924. Serial No. 701,062.

The invention relates to vehicle brakes, and more particularly to those brakes for use with automotive vehicles and trailers for such vehicles.

The general object of the invention is to provide a fluid-pressure-operated brake mechanism which may be readily applied to or be used in connection with the front or rear wheels or transmission shaft of road vehicles of the automotive type, and satisfy the particular service conditions met with therein, and to improve generally the brake construction of my prior Patent No. 1,291,765, dated January 21, 1919.

A further object of my invention is to provide a fluid-pressure-operated motor, generally called a "brake-cylinder" in which one or more pistons move outwardly to apply the brake member or members to the brake-drum of the wheel, each piston being so connected with the brake member which it operates that the initial adjustment may be readily effected and the relative relation of the parts will be maintained under conditions of heavy service.

A further object of the invention is to provide a brake mechanism in which the piston rod of the brake-cylinder has a direct thrusting, adjustable, rigid, or unyielding connection with the brake member that engages the brake-drum.

The invention further consists in the several features hereinafter described and more particularly defined by claims at the conclusion hereof.

In the drawings:

Fig. 1 is an elevation view of brake mechanism embodying the invention applied to the brake-drum of a steering wheel, parts of the wheel being omitted;

Fig. 2 is a section taken on the line 2—2 of Fig. 1, the steering knuckle and brake cylinder being shown in bottom plan view;

Fig. 3 is an elevation view of brake mechanism embodying the invention, applied to a rear wheel;

Fig. 4 is a section taken on the line 4—4 of Fig. 3;

Fig. 5 is a side elevation view of brake mechanism applied to the brake-drum of a wheel, parts being shown in section and parts of the wheel being omitted;

Fig. 6 is an end elevation view of the parts shown in Fig. 5 looking from the left-hand side thereof, the spring being omitted;

Fig. 7 is a section taken on the line 7—7 of Fig. 5, parts being broken away;

Fig. 8 is a detail sectional view through the fluid-pressure-operated motor, said section being taken along the line 8—8 of Fig. 1;

Fig. 9 is an elevation view, parts being shown in section, of brake mechanism applied to a wheel, parts of the wheel being omitted;

Fig. 10 is a detail sectional view taken on the line 10—10 of Fig. 9;

Fig. 11 is a detail sectional view taken on the line 11—11 of Fig. 9;

Fig. 12 is a detail sectional view taken on the line 12—12 of Fig. 9;

Fig. 13 is a detail sectional view taken on the line 13—13 of Fig. 14, parts being shown in section, of brake mechanism applied to a wheel;

Fig. 14 is a detail sectional view taken on the line 14—14 of Fig. 13; and,

Fig. 15 is an elevation view, parts being shown in section, of parts shown by Figs. 13 and 14.

In the following specification the word "brake-drum" will be used in the generic sense to designate any part associated with the vehicle wheel and which is intended to reduce its speed or stop its motion when another part is brought into braking engagement therewith, and the word "brake" will be used in the generic sense to designate the part or one of its parts which is brought into frictional or braking contact with the brake-drum.

Referring to the drawings the numeral 1 designates a wheel and 2 a brake-drum, and 3 or 3' a brake. The brake-drum 2 may be secured to the wheel 1 by bolts 4, or in any other suitable manner. The brake 3 in Figs. 1 to 7, inclusive, is in the form of a band of the split ring type adapted to engage the drum, and in Figs. 1 to 4, inclusive, this band is an internal expanding band, while in Figs. 5 to 7, inclusive, the band is an external brake-band. In Figs. 9 to 15, inclusive, the brake 3' is in the form of a shoe or shoes adapted to engage the inner side of the brake-drum.

There are two requirements which brake mechanism should meet, to be reliable; one is quick and efficient setting with adequate braking power and the other is full release. The first requirement is met in this in-

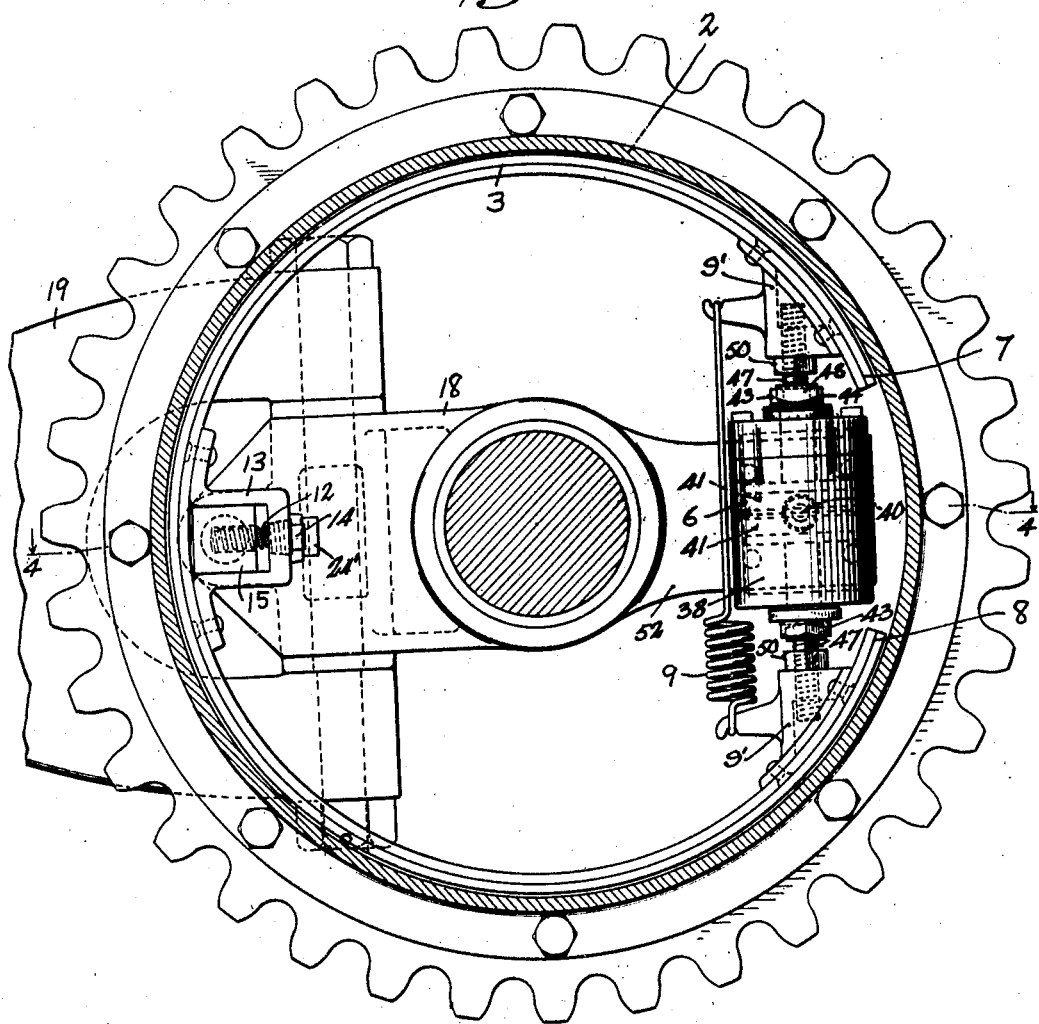

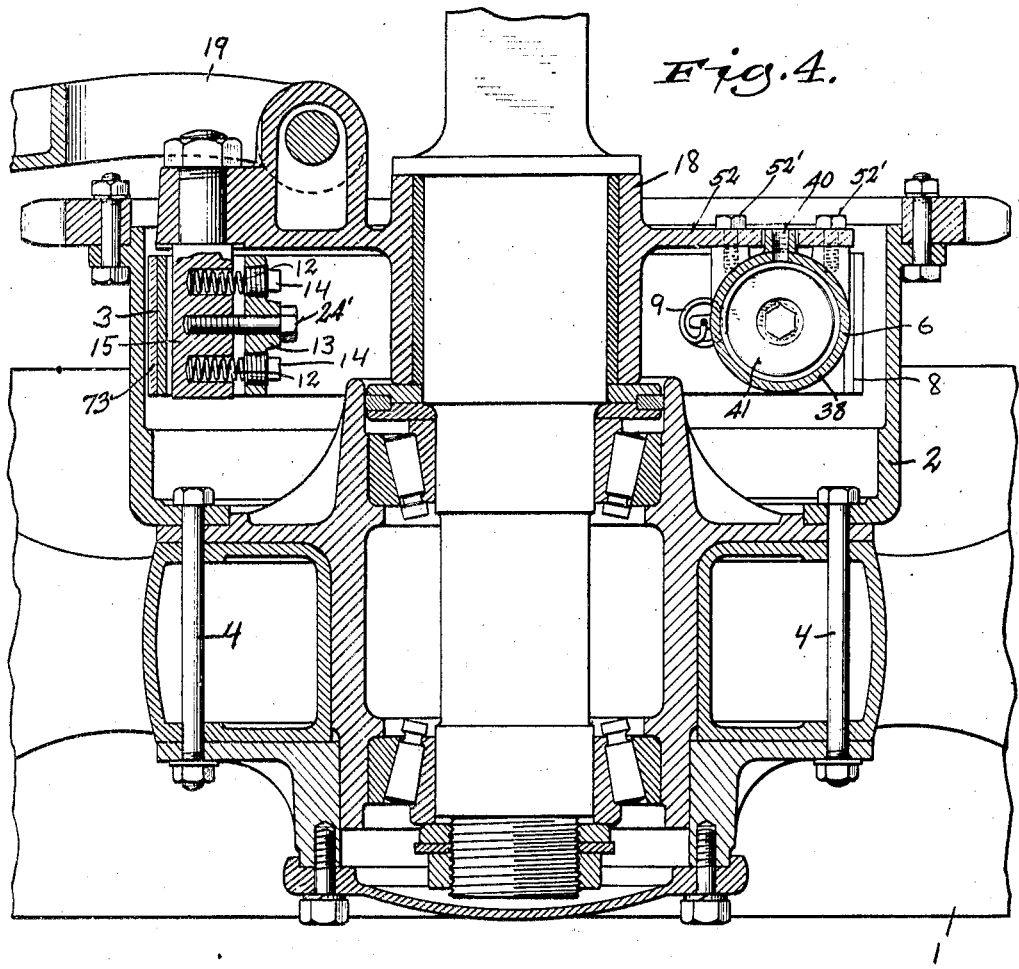
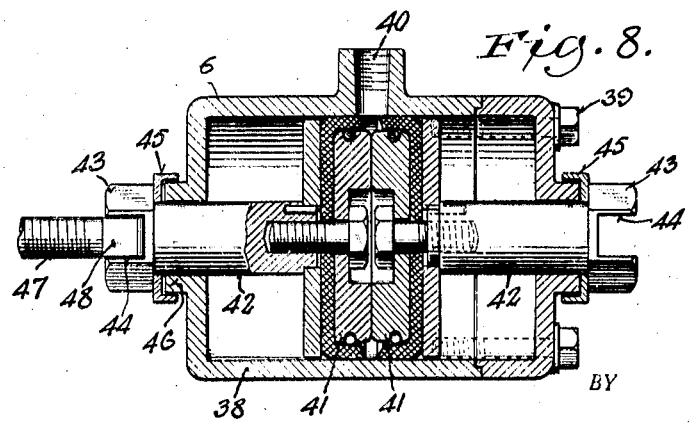

March 8, 1927.
N. A. CHRISTENSEN
1,620,073
VEHICLE BRAKE
Filed March 22, 1924    6 Sheets-Sheet 4
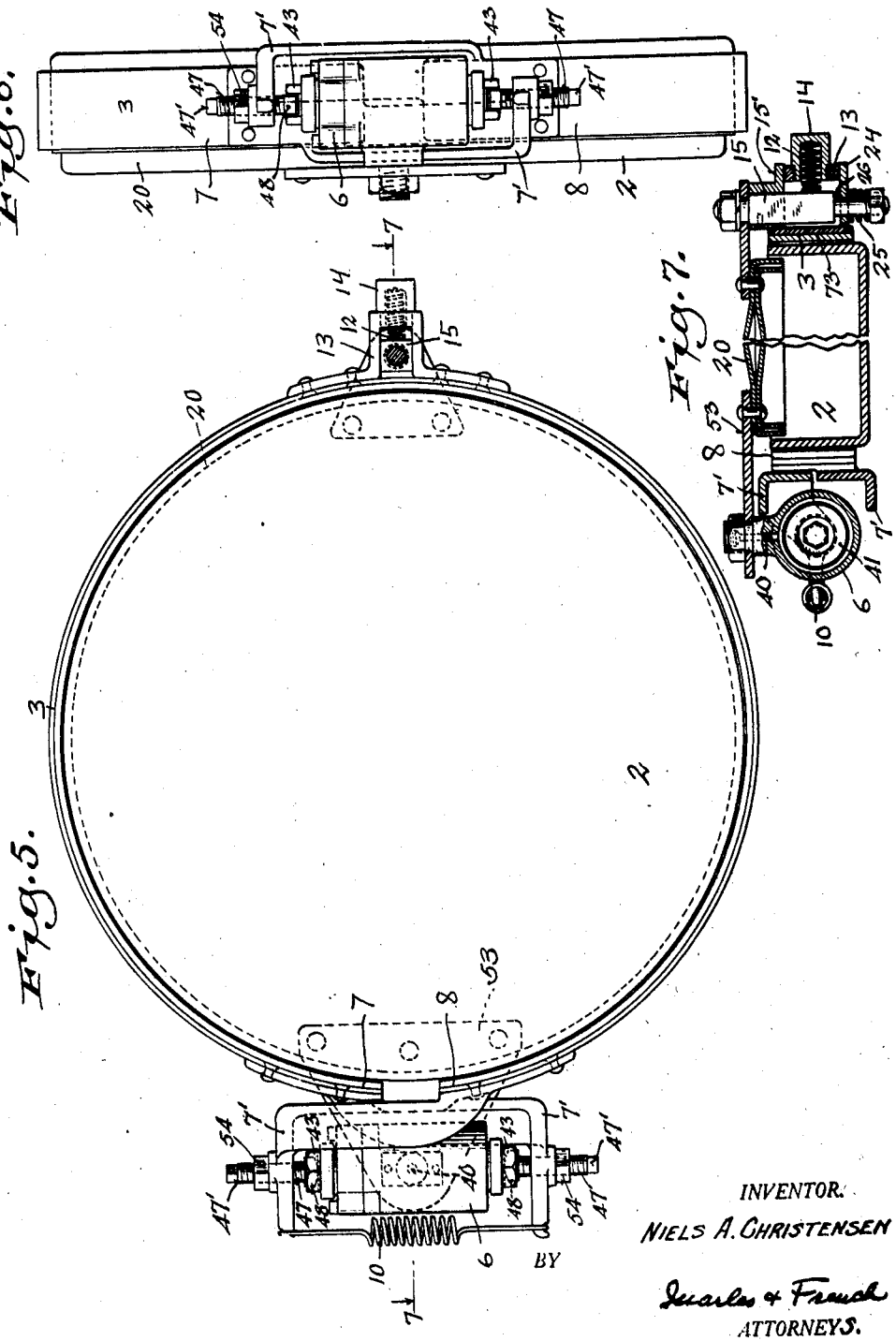
INVENTOR.
NIELS A. CHRISTENSEN
BY
ATTORNEYS.

March 8, 1927.
N. A. CHRISTENSEN
1,620,073
VEHICLE BRAKE
Filed March 22, 1924 6 Sheets-Sheet 5
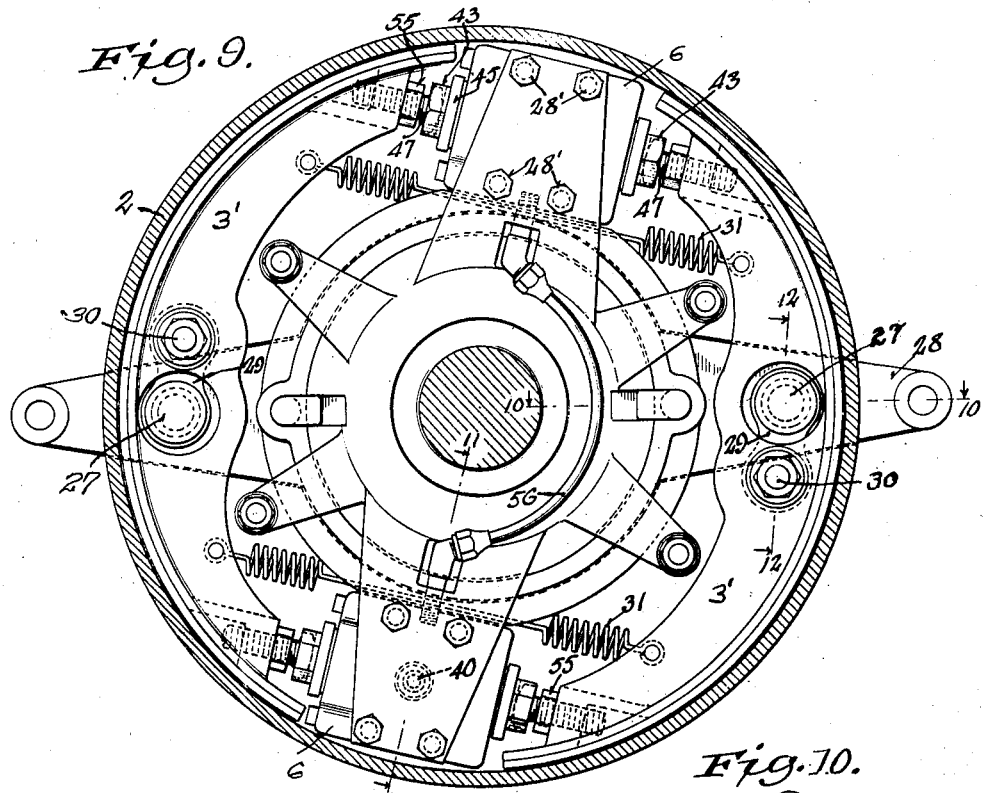
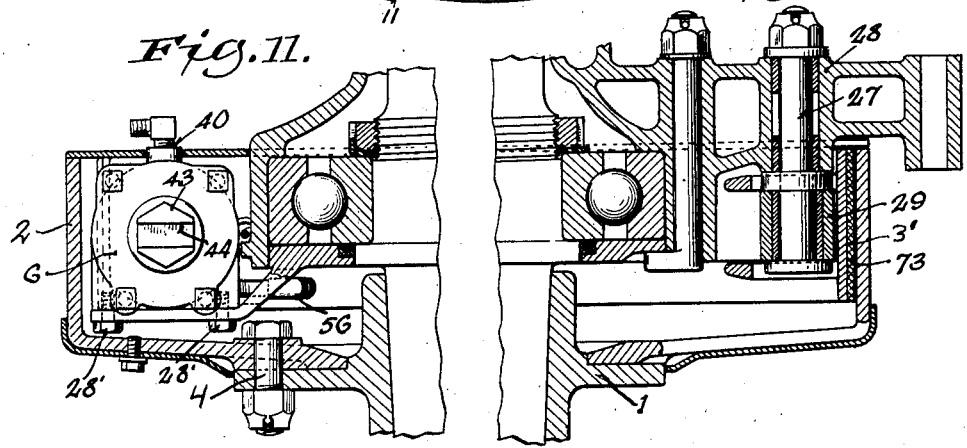
INVENTOR.
NIELS A. CHRISTENSEN
BY
Quarles & French
ATTORNEYS.

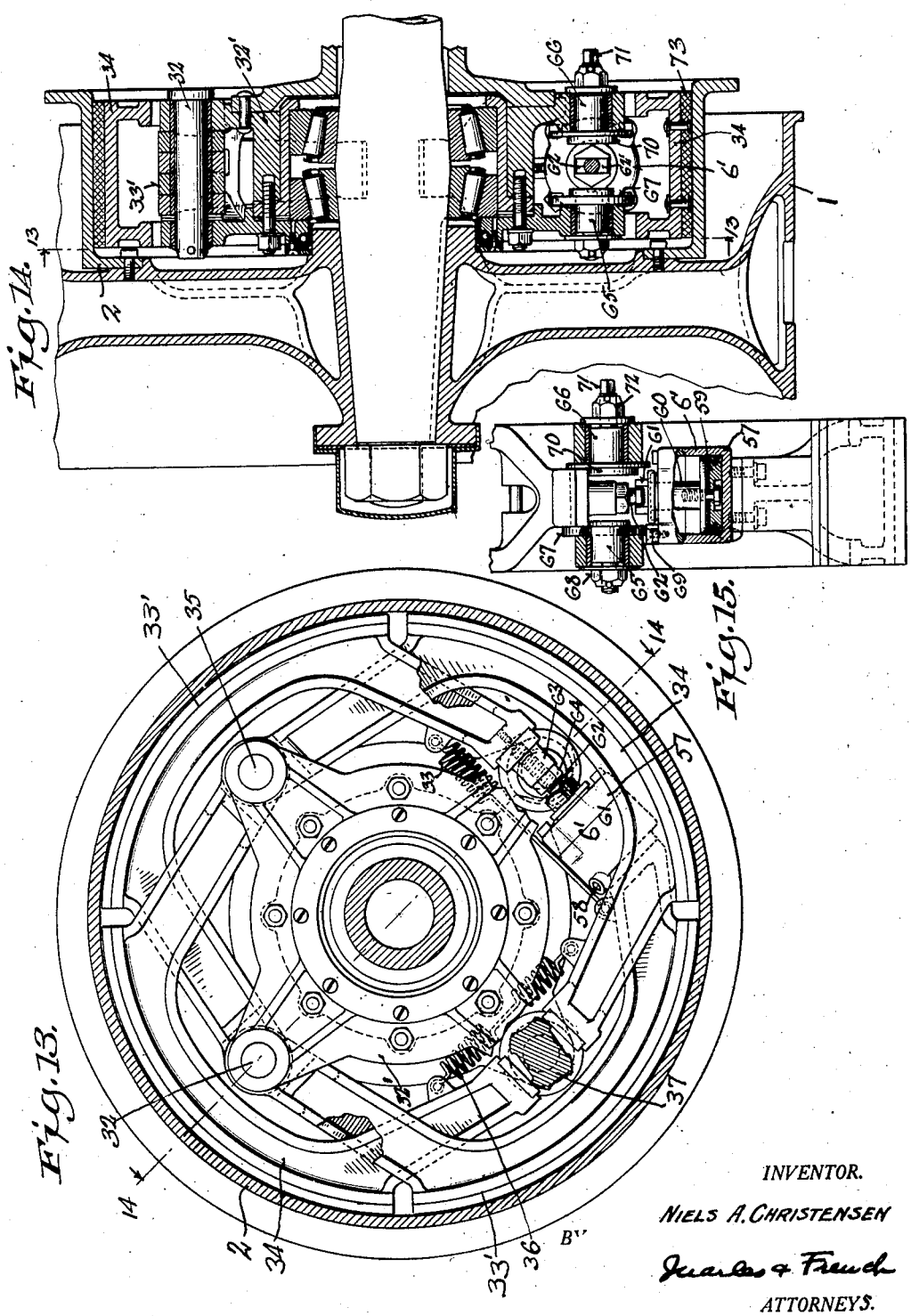

Patented Mar. 8, 1927.

1,620,073

UNITED STATES PATENT OFFICE.

NIELS A. CHRISTENSEN, OF MILWAUKEE, WISCONSIN.

VEHICLE BRAKE.

Application filed March 22, 1924. Serial No. 701,062.

The invention relates to vehicle brakes, and more particularly to those brakes for use with automotive vehicles and trailers for such vehicles.

The general object of the invention is to provide a fluid-pressure-operated brake mechanism which may be readily applied to or be used in connection with the front or rear wheels or transmission shaft of road vehicles of the automotive type, and satisfy the particular service conditions met with therein, and to improve generally the brake construction of my prior Patent No. 1,291,765, dated January 21, 1919.

A further object of my invention is to provide a fluid-pressure-operated motor, generally called a "brake-cylinder" in which one or more pistons move outwardly to apply the brake member or members to the brake-drum of the wheel, each piston being so connected with the brake member which it operates that the initial adjustment may be readily effected and the relative relation of the parts will be maintained under conditions of heavy service.

A further object of the invention is to provide a brake mechanism in which the piston rod of the brake-cylinder has a direct thrusting, adjustable, rigid, or unyielding connection with the brake member that engages the brake-drum.

The invention further consists in the several features hereinafter described and more particularly defined by claims at the conclusion hereof.

In the drawings:

Fig. 1 is an elevation view of brake mechanism embodying the invention applied to the brake-drum of a steering wheel, parts of the wheel being omitted;

Fig. 2 is a section taken on the line 2—2 of Fig. 1, the steering knuckle and brake cylinder being shown in bottom plan view;

Fig. 3 is an elevation view of brake mechanism embodying the invention, applied to a rear wheel;

Fig. 4 is a section taken on the line 4—4 of Fig. 3;

Fig. 5 is a side elevation view of brake mechanism applied to the brake-drum of a wheel, parts being shown in section and parts of the wheel being omitted;

Fig. 6 is an end elevation view of the parts shown in Fig. 5 looking from the left-hand side thereof, the spring being omitted;

Fig. 7 is a section taken on the line 7—7 of Fig. 5, parts being broken away;

Fig. 8 is a detail sectional view through the fluid-pressure-operated motor, said section being taken along the line 8—8 of Fig. 1;

Fig. 9 is an elevation view, parts being shown in section, of brake mechanism applied to a wheel, parts of the wheel being omitted;

Fig. 10 is a detail sectional view taken on the line 10—10 of Fig. 9;

Fig. 11 is a detail sectional view taken on the line 11—11 of Fig. 9;

Fig. 12 is a detail sectional view taken on the line 12—12 of Fig. 9;

Fig. 13 is a detail sectional view taken on the line 13—13 of Fig. 14, parts being shown in section, of brake mechanism applied to a wheel;

Fig. 14 is a detail sectional view taken on the line 14—14 of Fig. 13; and,

Fig. 15 is an elevation view, parts being shown in section, of parts shown by Figs. 13 and 14.

In the following specification the word "brake-drum" will be used in the generic sense to designate any part associated with the vehicle wheel and which is intended to reduce its speed or stop its motion when another part is brought into braking engagement therewith, and the word "brake" will be used in the generic sense to designate the part or one of its parts which is brought into frictional or braking contact with the brake-drum.

Referring to the drawings the numeral 1 designates a wheel and 2 a brake-drum, and 3 or 3' a brake. The brake-drum 2 may be secured to the wheel 1 by bolts 4, or in any other suitable manner. The brake 3 in Figs. 1 to 7, inclusive, is in the form of a band of the split ring type adapted to engage the drum, and in Figs. 1 to 4, inclusive, this band is an internal expanding band, while in Figs. 5 to 7, inclusive, the band is an external brake-band. In Figs. 9 to 15, inclusive, the brake 3' is in the form of a shoe or shoes adapted to engage the inner side of the brake-drum.

There are two requirements which brake mechanism should meet, to be reliable; one is quick and efficient setting with adequate braking power and the other is full release. The first requirement is met in this instance by a fluid-pressure-operated motor, usually called a "brake-cylinder" designated generally by the numeral 6 or 6' (Fig. 13) and preferably using compressed air as a working medium because of its ease of control, its adaptability for efficient service throughout all seasons of the year in different climates, and its practical efficiency even where small leakage may occur in the motor.

The second requirement is met by a suitable power mechanism, preferably other than the fluid-pressure motor or motors which set the brakes. Such power mechanism may be of any suitable construction or type so arranged as to keep the brakes clear of their drums when not in operation, and preferably such power mechanism consists of suitably mounted springs in which brake-release power is stored by the fluid-pressure motor 6 or 6' during the setting of the brakes.

The free ends of the brakes 3 of the band form, which are illustrated in Figs. 1 to 7, inclusive, are designated by the reference numerals 7 and 8 in each instance. If the band form of brake is used internally, as shown in Figs. 1 to 4, inclusive, the brake is released in part by one or more springs 9 connected to projections on lugs 9' secured to the ends of the band. If the band form of brake be externally applied, as in Figs. 5 to 7, inclusive, the brake is released in part by a spring 10 secured to projections or lugs on arms 7' secured to the ends of the band. In each instance with the band form of brake a spring or springs 12 acts or act in a radial direction and against the central part of the band, moves or move said band bodily away from its brake-drum 2, and for this purpose a yoke 13 is secured to the central portion of the band, and the spring 12 in each instance acts between a screw-threaded plug 14 in said yoke and an anchor member 15. Each yoke 13 provides a flat-sided slot in which the squared or flat-sided portion of the anchor member 15 is slidably mounted so that the yoke cannot turn but is restricted to a straight line movement in a radial direction. The anchor member 15 is in each instance secured to some non-rotatable part which may be a part separately provided for the purpose or an existing part of the vehicle construction, as shown by the drawings where an arm 16 is shown in Figs. 1 and 2 extending outwardly from the steering knuckle 17 and has the member 15 bolted thereto, or where an axial connection 18 of the radius and brake-rod 19 has the anchor member 15 bolted thereto, as shown in Figs. 3 and 4, or where an axle housing 20 has the member 15 bolted thereto, as shown in Figs. 5 and 7.

To prevent lateral displacement of the band, in Figs. 1, 2 and 7 I show a plate 24 yieldingly held against the yoke 13 by a spring 25 mounted on the outer end of the member 15, said plate in each instance being prevented from rotating relative to the anchor member by a pin 26 engaging in an opening in the anchor member 15. In Figs. 1 and 2 this plate acts to yieldingly position said yoke against the arm 16, while in Fig. 7 this plate acts to yieldingly position said yoke between it and a ferruled plate 15' pinned or otherwise suitably secured to the member 15. In Figs. 3 and 4 a bolt 24' mounted in the member 15 forms a support and guide for the yoke and is slidably mounted in the yoke, and two springs 12 on each side of said bolt are used to normally hold the band in a released position. The anchor member 15 is clamped or held against turning movement in each instance by its connection with the non-rotatable part by which it is carried.

In the shoe form of brake shown in Figs. 9 to 12, inclusive, an anchor pin 27 is secured to a part 28 of the axle housing and has an anchor link 29 pivotally mounted thereon and carrying a brake-connecting-pin 30 to which the brake-shoe 3' is pivotally connected, preferably in the central portion thereof, whereby when pressure is put upon the ends of the shoe the outer surface of said shoe concentric with the drum will move into contact therewith substantially throughout the length of said shoe. In this construction the release of the shoes 3' is accomplished by springs 31 which connect adjacent ends of the shoes 3' and act to move said shoes toward the center of the wheel and thereby release the shoes from engagement with the drum.

In the shoe form of brake shown in Figs. 13 to 15, inclusive, the brake-shoes 33' are pivotally connected at one end to a pin 32 mounted in the arms of an axle housing 32', and said shoes are normally held in a released position by a spring 33 secured at its ends to lugs on what may be termed the "free" ends of said shoes. In this particular construction additional braking mechanism is provided consisting of a mechanically-operated brake comprising U-shaped brake members or shoes 34 pivotally mounted at one of their ends on a pin 35 mounted in the arms of the axle housing 32' and held in a released position by a spring 36 secured to lugs adjacent the free ends of said shoes and set by an oscillatory cam member 37 under the control of and operated mechanically by suitable and well known means by the operator of the vehicle. It will be understood from Figs. 13 and 14 of the drawings that the brake-shoes 33' and 34 have spaced arms to permit independent movement of each set of shoes.

In Figs. 1 to 12, inclusive, the brakes in each instance are set or applied by a fluid-pressure motor of the opposed piston type, which may, therefore, be termed a "double-acting motor" or "brake-cylinder," which is shown in detail in Fig. 8. This motor comprises a two-part brake-cylinder 38 whose parts are secured together by bolts 39 and which is provided with a central air-port 40 for the inlet and exhaust of compressed air, a pair of opposed suitably packed pistons 41 working in said cylinder and having piston rods 42 bolted or otherwise secured to the heads of said pistons and projecting from the ends of the cylinder and having polygonal heads 43 exterior of the brake cylinder and provided with slots 44. The heads 43 of the piston rods are preferably larger in diameter than the piston rod and have a flanged washer 45 abutting against them, and said pistons are limited in their movement of inward travel by the engagement of the inner end of said heads or said washers with a shoulder 46 formed by the ends of the cylinder. In each instance the piston rods 42 are directly and adjustably connected with the brake by means of an adjustable jack-screw 47 which has its head milled flat to form a T-shaped member or tongue 48 fitting into slot 44 of the piston rod. As the head 43 of the piston is hexagonal it may be engaged by a wrench or other suitable tool so that the screw 47 may be screwed up into the lug or other anchorage provided for it on the brake and secured in adjusted position by a suitable locknut. As shown in Figs. 1 and 3 the adjusting screw has a threaded connection with the lugs 9' and when adjusted relative to the piston rods is held in such adjusted position by means of a locknut 50. In Figs. 1 and 2 the brake-cylinder itself is secured by bolts 51' to an arm 51 formed as a part of or secured to the steering knuckle 17, while in Figs. 3 and 4 the brake-cylinder is secured by bolts 52' to an arm 52 formed as a part of the torque rod connector member 18. In Figs. 5 to 7, inclusive, the brake cylinder is bolted to a bracket 53 secured to the axle housing 20 and the adjusting screws 47 have a threaded connection with the arms 7' and are locked in adjusted position by nuts 54. The adjusting screws 47 are also shown as provided with squared ends 47' for turning them from this end if desired. It will be observed in connection with the exterior band construction in Figs. 5 to 7, inclusive, that the arms 7' are arranged in an overlapping relation to utilize the outward movement of the pistons of the motor to contract the band about the drum 2.

In Figs. 9 to 12, inclusive, the fluid-pressure motors 6 are secured by bolts 28' to the axle housing 28 and the jack-screws 47 have threaded connection with the ends of the brake shoes 3' and are locked in adjustment by locknuts 55.

With all of the construction shown by Figs. 1 to 12, inclusive, when compressed air is introduced into the brake cylinder through the port 40 the pistons are moved outwardly and their rods through their connection with the jack-screws produce a direct thrust against the brake member with which the jack-screws are connected to apply the brake; in the case of the internal brake forcing the brake-band or brake-shoes outwardly against the drum and in the case of the external band forcing the band inwardly against the drum to stop its rotation and hence stop the rotation of the wheel connected therewith. In the case of the steering wheel, such as shown in Figs 1 and 2, it will be noted that the mounting of the motor on the steering knuckle prevents any interference of the operation of said motor with the steering of the wheel, it being understood that in each instance suitable piping, either flexible or rigid, depending upon operating conditions, is provided and connected with the inlet 40, and in case of the double motor construction shown in Fig. 9, a pipe 56 leading to the central portion of the cylinders may connect both cylinders to receive the motive fluid by its passage from one to the other.

In the construction shown in Figs. 13 to 15, inclusive the space available for the motor is not sufficient to provide a double-acting motor and consequently I use a single-acting fluid-pressure-operated motor 6' in which the two-part cylinder 57 is bolted or otherwise suitably secured to the free end of one of the shoes 33', said cylinder having an air port 58 at one end thereof and a suitably packed piston 59 working in said cylinder adjacent said end and provided with a piston rod 60 having a slotted head 61 similar to the head 43 and connected to an adjusting screw 62 similar to the screw 47 by a tongue-and-groove connection formed by the flat head 62' and slot 61, said adjusting screw being mounted in a hardened steel block 63 secured to the other shoe 33' and held in adjusted position by a locknut 64. In this construction also special means are provided for centralizing the brake-shoes 33'. This includes studs 65 and 66 arranged in the housing 32' or parts firmly attached thereto. The stud 65 has a head concentric with its body and an eccentric disk 67 is interposed between said head and the axle housing and can be securely locked into place by tightening the nut 68 on the end of the stud 65. This eccentric disk 67 is brought into contact with the hardened steel block 69 fixed on the brake-cylinder cover and by moving the eccentric disk around to the proper position the clearance between the shoe 33' directly associated with the cylinder and the brake-drum can be definitely made, after which the nut 68 is securely locked and pinned in position. Any subsequent adjustment can be made by loosening this nut 68 and by means of a suitable tool the plate 67 can be turned around to change the shoe clearance to the then required amount. Thus, the clearance for the brake-shoe having the brake-cylinder attached thereto is readily obtained. The adjustment for the other shoe opposite to the brake-cylinder is done by means of the stud 66. This stud is provided with a head 70 eccentric with relation to its body, which by turning in the housing in which the stud 66 is fitted is brought around into contact with a part of the hardened steel block 63 fastened to the end of the brake-shoe. The turning of the stud 66 is preferably done by a wrench applied to the squared head 71 on its outer exposed end and when the proper clearance has been made by the eccentric coming into contact with the hardened block 63 the stud 66 is locked in adjusted position by a castellated nut 72 which may be then pinned to the stud. Thus, the eccentric disks 67 and 70 provide adjustable stops engageable with parts of the brake-shoes to limit their inward movement and hence provide the necessary clearance between said shoes and the brake-drum, the spring 33 holding said shoes up against said stops until the air pressure working against the piston 59 moves said shoes outwardly into engagement with the drum. In each instance the band or shoes may be and preferably are provided with a suitable brake-lining 73.

It will be noted that the drawings show flattened heads 48 of the jack screws 47 and the slots 44 in the heads 43 of the piston rods of the constructions shown in Figs. 1 to 12, inclusive, as positioned parallel to the disk portion of the drum, and that the head 62' of the jack screw 62, shown in Figs. 13 to 15, inclusive, is similarly positioned. This feature is important because these screws cooperate with the slotted piston rod to prevent lateral movement of the free ends of the bands or shoes relative to the drum with which they cooperate.

No mechanism has been shown for controlling the passage of compressed air to and from the brake-cylinders, as such mechanism is of separate and distinct subject matter from the brake mechanism itself though it will be understood that such mechanism includes a valve structure which establishes communication between a supply of compressed air and the brake-cylinders to operate the piston or pistons therein and then cuts off this supply and connects the brake-cylinder with the atmosphere for release of the brake.

It will be noted that in the various forms of my invention herein shown, the piston of the fluid-pressure motor exerts a direct thrust against the brake, that the brake may be readily adjusted to maintain its position of full release when the motor is not being operated, and that the connection between the jack-screw and the motor permits direct disconnection of the parts without the necessity for removing pins or intermediate linkage between the motor and brake, and that the spring means for releasing the brake are free of the motor and directly connected to the brake.

It will be noted that the arm 51 for supporting the brake-cylinder is arranged in back of the wheel axle on the knuckle 17 and in a substantially horizontal position, and that the arm 16 is disposed in line with and on the opposite side of the pivotal bearing of said knuckle.

While I have described the brake construction as associated with the wheel of the vehicle, it is to be understood that the same may be used as a transmission brake, in which instance the brake-drum is attached to the drive-shaft of the vehicle and, consequently, when I refer to a "brake-drum" in the appended claims I mean a brake-drum attached either to the wheel of the vehicle or to the drive-shaft operatively connected to the rear axle. Furthermore, I have mentioned "compressed air" as the power-transmitting medium but I do not wish to be limited thereto as any other suitable gas or oil, or other suitable liquid, may be used to operate the brake motor.

The flanged washers 45 are preferably used in connection with the enlarged heads 43 of the motor pistons where such pistons are vertically disposed, as the washer associated with the upper piston acts as a shed or covering to prevent water that may accumulate on the head 43 from passing down the piston rod and into the motor cylinder.

As the particular features of the brake construction shown in Figs. 9 to 11, inclusive, aside from the features common to all the constructions shown, have been made the subject-matter of a separate application, Serial No. 702,866, filed March 29, 1924, and as the particular features of the brake construction shown in Figs. 13 to 15, inclusive, aside from the features common to all the constructions shown, have been made the subject-matter of a separate application, Serial No. 702,864, filed March 29, 1924, the absence of claims herein to these features is not to be considered as a dedication or waiver of right to claims for these particular features.

I desire it to be understood that this invention is not to be limited to any particular form or arrangement of parts except in so far as such limitations are included in the claims or necessitated by the prior art.

What I claim as my invention is:

1. In brake mechanism of the class described, the combination with a brake-drum, of a brake, a fluid-pressure motor having a fluid-pressure-operated thrust rod, an adjustable direct end thrust connection between said rod of said motor and said brake including a jack-screw and means for locking said screw in adjusted position, and means to release the brake.

2. In brake mechanism of the class described, the combination with a brake-drum, of a brake, a fluid-pressure motor for setting the brake, a connection between said motor and brake including an adjustable jack-screw and a tongue-and-groove connection between said screw and a fluid-pressure-operated part of said motor, and means to release said brake.

3. In brake mechanism of the class described, the combination with a brake-drum, of a brake, a fluid-pressure motor for setting the brake, a jack-screw adjustably carried by the brake and having a direct thrust connection with and operated by a moving part of said motor, and means to release said brake.

4. In brake mechanism of the class described, the combination with a brake-drum, of a brake, a brake-cylinder, a piston working in said cylinder and having a rod fixedly secured to said piston and provided with a polygonal head exterior of said cylinder, an adjustable thrust and guide connection between said rod and said brake, and means to release the brake.

5. In brake mechanism of the class described, the combination with a brake-drum, of a brake, a brake-cylinder, a piston working in said cylinder and having a rod provided with a slotted polygonal head exterior of said cylinder, a jack-screw having its head slidably engaging in said slot and operatively connected to said brake, and means to release the brake.

6. In brake mechanism of the class described, the combination with a brake-drum, of a brake, a fluid-pressure-operated motor including a fluid-pressure-operated thrust rod, an adjustable thrust and guiding connection between said rod and brake to force the brake into contact with and prevent its lateral movement relative to said drum, and means to release said brake.

In testimony whereof, I affix my signature.

NIELS A. CHRISTENSEN.